Oct. 20, 1959   R. ROSEBROOK   2,909,357
AUTOMATIC TRACER CONTROL
Filed Oct. 22, 1956   3 Sheets-Sheet 3

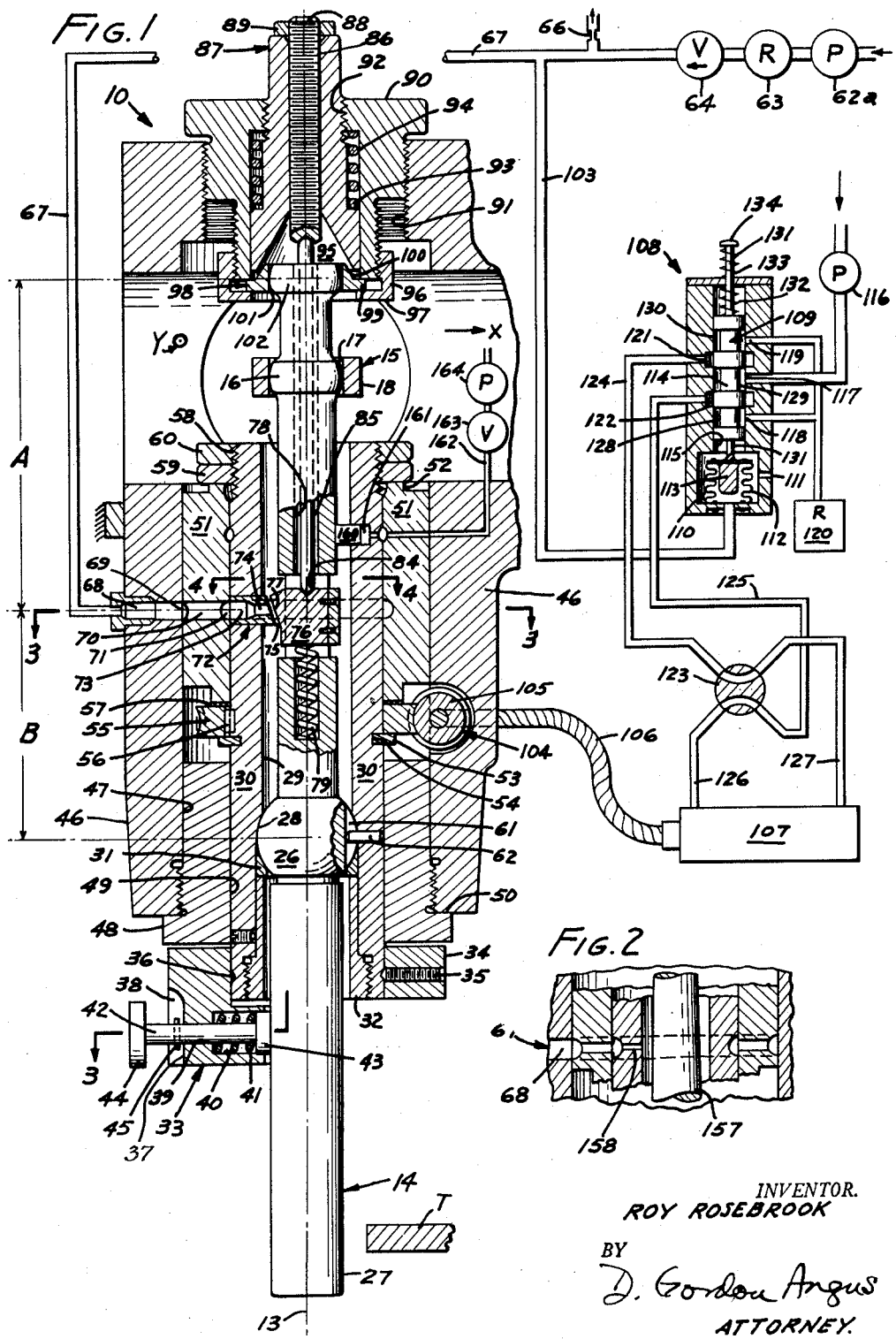
Oct. 20, 1959 — R. ROSEBROOK — 2,909,357
AUTOMATIC TRACER CONTROL
Filed Oct. 22, 1956 — 3 Sheets-Sheet 1
INVENTOR.
ROY ROSEBROOK
BY D. Gordon Angus
ATTORNEY.

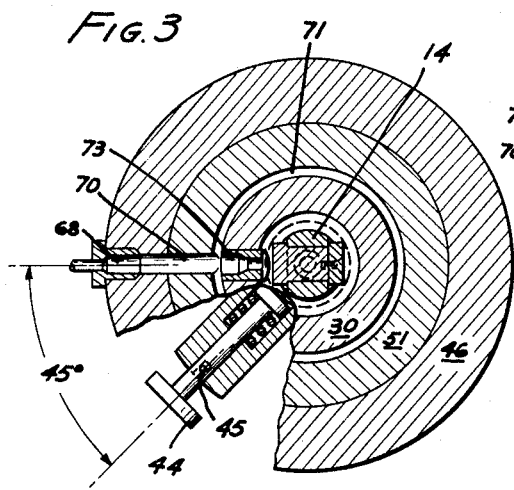
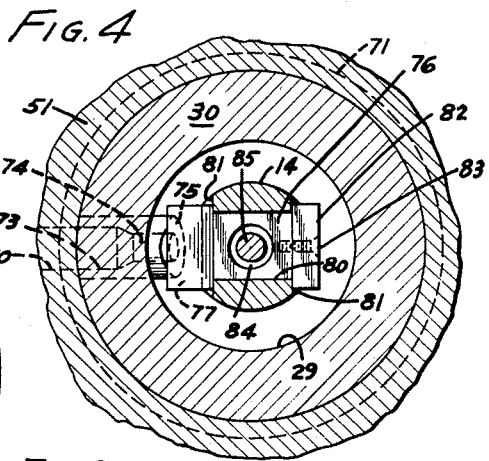
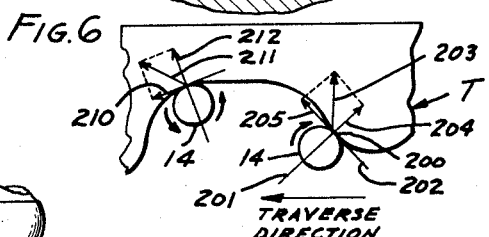
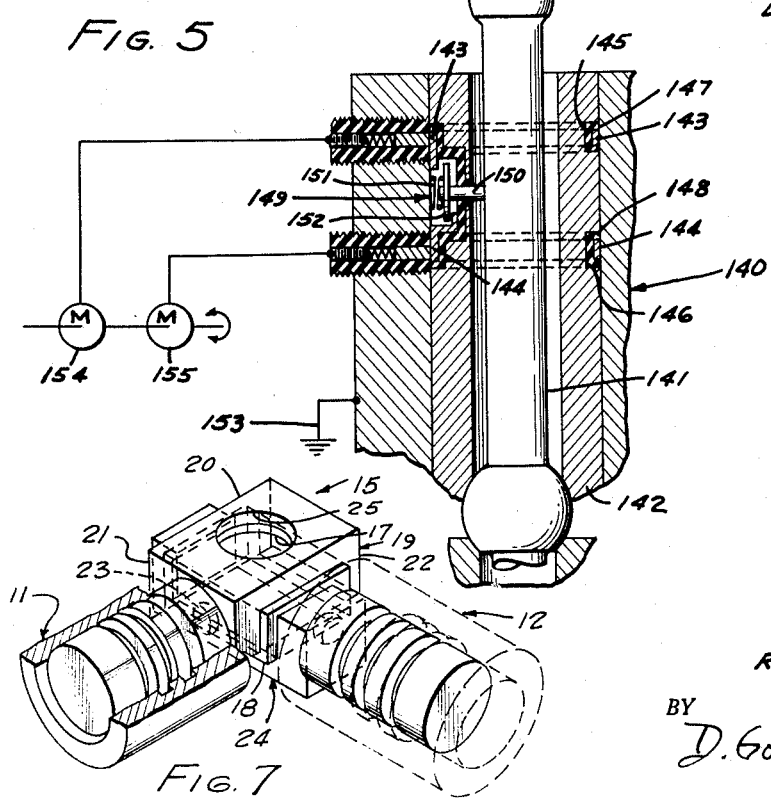
INVENTOR.
ROY ROSEBROOK
BY D. Gordon Angus
ATTORNEY.

INVENTOR.
ROY ROSEBROOK

BY
D. Gordon Angus
ATTORNEY.

United States Patent Office 2,909,357
Patented Oct. 20, 1959

2,909,357

AUTOMATIC TRACER CONTROL

Roy Rosebrook, Montebello, Calif., assignor to True-Trace Corporation, El Monte, Calif., a corporation of California Application October 22, 1956, Serial No. 617,374

15 Claims. (Cl. 251—3)

This invention relates to a machine tool control of the type commonly known as a tracer valve. Such valves are most frequently used as controls for relatively positioning a workpiece and a cutting tool for the purpose of duplicating the contour of a template or a pattern.

A tracer valve of this general type is shown in United States Patent 2,753,145 to Roy Rosebrook, issued July 3, 1956. This patent may be consulted for more complete information regarding details of tracer valve construction and operation which are not directly involved in the elements of this invention.

The actuating control of this type of tracer valve is a stylus member which is moved along the contour of a template to be duplicated. In operation, the tip of the stylus is deflected, or tilted, toward the template. This stylus deflection adjusts the position of valve means, which valve means regulate the flow of pressurized fluid to power means which relatively shift the workpiece and the cutting tool. With the stylus tilted toward the template, the shifting movement causes the two to make contact with each other. The shifting movement is thereafter limited because its tendency is to cause the template to force the stylus toward a neutral position, and the shifting movement in that direction will then cease. Thereafter, the operator will displace the tip of the stylus laterally relative to a line which is normal to the profile of the template at the point of contact between the stylus and the template. This lateral deflection opens one or more valves and thereby causes the machine tool members to shift so that the stylus travels along the profile of the template. Exerting a bias force component normal to the contour of the template at the point of contact therewith holds the stylus against the template so that the stylus will follow undulations of the profile. The machine tool is thereby controlled to duplicate the profile of the template. It is not possible for the cutting tool to cut too far into the workpiece, because the template opposes the bias force when the stylus contacts it, and this tends to restore the stylus to a neutral position along the normal line, thereby stopping any deeper cutting into the workpiece.

From the above brief exposition of the principle of operation of a tracer valve of this type, it will be appreciated that the operation of a contour duplicating machine utilizing this control is simply a matter of deflecting the stylus so that the stylus makes contact with the template edge, and then displacing the stylus so that it moves along the template edge, in contact with said template edge.

In previously-known tracer valves, once the set-up of the machine was accomplished, the operator's whole function was simply to manually deflect the stylus so that the tip contacted the template edge, and then to laterally deflect the stylus tip, while maintaining the stylus in contact with the template. This stylus deflection calls for little or no skill or judgment in a properly set-up machine, and a mechanical technique which could respond to signals so as to properly displace said stylus, could save expensive labor costs, and also relieve skilled mechanists of the boresome and repetitious task of tracing a stylus tip time after time around the same template or pattern.

Accordingly, it is an object of this invention to provide means in combination with a tracer valve for automatically deflecting a tracer valve stylus so as to cause the stylus tip to trace along a template or pattern.

According to this invention, a tracer valve is used which has a pair of valves for controlling application of power to relatively shift a workpiece and a cutting tool (said valves being operatively connected to a tracer stylus whereby deflecting the tracer stylus adjusts the said valves to control the application of said power). Each of the valves controls movement along one of two mutually perpendicular axes. The stylus is mounted in a rotatable sleeve within the tracer valve, and this sleeve carries bias means for deflecting the tip of the stylus, which tip protrudes from the tracer valve. Reversible means are provided for turning the sleeve so as to apply the bias means to the stylus in different lateral directions around the stylus axis. Sensing means on the sleeve sense the spacing between the sleeve wall and the stylus, and are operatively connected to the said reversible means. The term "spacing between the sleeve wall and the stylus" will be used frequently in this specification to indicate the degree of tilting of the stylus relative to surrounding structure. It will be understood that the sleeve wall is merely used as a convenient point of reference as a part of immovable valve structure, and that the tilt of the stylus relative to other parts could as well have been measured, the sleeve wall being exemplary of useful structure for a point of reference. By means of the above-described structure, the bias means are applied against the stylus so as to deflect the stylus in a manner such that the stylus traces along the template, by virtue of its being held against the template, and being displaced laterally to a line normal to the point of contact between the stylus and the template.

A preferred but optional feature of this invention resides in providing the sensing means in the form of a variable air-bleed orifice, the spacing of the sleeve wall and the stylus determining the actuating of said reversible means for turning the said sleeve and bias means.

The above and other features of this invention will be fully understood from the following detailed description and the accompanying drawings of which:

Fig. 1 is a side view, partly in cutaway cross-section of a system according to the preferred embodiment of the invention;

Fig. 2 is a fragmentary cross-section illustrating an alternate type of sensing means useful in the tracer valve of Fig. 1;

Fig. 3 is a cutaway cross-section view, partly in plan, taken at lines 3—3 of Fig. 1, Fig. 3 being a composite view showing parts of the device of Fig. 1 at two separate elevations;

Fig. 4 is a cross-section taken at line 4—4 of Fig. 1;

Fig. 5 shows an alternate type of sensing and reversible means for controlling the bias condition in this invention;

Fig. 6 is a schematic drawing illustrating the operation of this device; and

Figure 7:
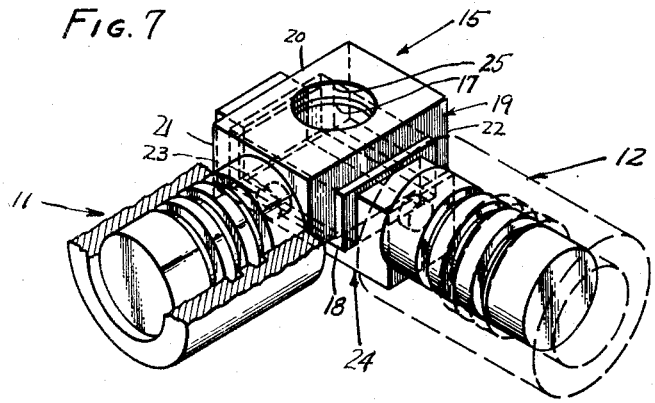
Fig. 7 is a perspective view of a portion of the device of Fig. 1.

A machine tool control according to this invention utilizes a tracer valve 10 as its primary control means. This tracer valve has an X axis spool valve 11 and Y axis spool valve 12. These spool valves are mounted with their axes perpendicular to each other. Their axes are also substantially perpendicular to the longitudinal axis 13 of a tracer stylus 14. It will be understood that the perpendicularity of a spool valve axis to the axis of the stylus occurs strictly only when the stylus is in its central position as shown in Fig. 1. However in actual construction, the angular deflection of the stylus from its central position is usually less than 14′ of arc, so that any variation from mutual perpendicularity of the three axes is ordinarily quite small. The details of construction of these spool valves form no part of this invention. Said details may be obtained from the aforesaid United States Patent No. 2,753,145.

The spool valves are operationally connected to the stylus by means of a yoke assembly 15 which is also fully disclosed in said patent. This yoke assembly is mounted to a ball-like member 16 which is incorporated in the stylus. The stylus passes through a hole 17 in rectangular prismatic block 18 so that the ball-like member 16 is disposed within the said hole, making a firm contact with the wall thereof. A U-shaped member 19 has a bight 20 and two legs 21, 22. Leg 21 is attached by means of rod 23 to X axis spool valve 11 so that deflection of the stylus in a direction having a component in the plane of Fig. 1 (which contains the X axis) would cause the ball-like member 16 to move the block 18 and the U-shaped member 19 so as to shift the spool of the X axis spool valve and regulate the rate and direction of flow through said valve. The regulated flow is directed to a power means for actuating the machine tool in the direction of the X axis.

Another U-shaped member 24 has a similar bight and a pair of legs and similar means of attachment to the Y axis spool valve 12. Bights of the U-shaped members are crossed relative to each other, and the legs are placed at opposite sides of the block 18 from each other, so that they enclose the block between them. The stylus passes through holes 25 in the bights of the U-shaped members. Deflection of the stylus in a direction having a component in a plane perpendicular to the plane of Fig. 1 (which plane contains the Y axis) shifts the spool of the Y axis spool valve, and thereby regulates the rate and direction of flow therethrough. The regulated flow is directed to a power means for actuating the machine tool in the direction of the Y axis.

The stylus 14 incorporates another ball-like member 26 along its length. This ball-like member is preferably, although not necessarily, placed at an intermediate position between the ends of said stylus. This ball-like member serves as a fulcrum, so that when the bottom (or tip) portion 27 of the stylus is deflected through some angle, then the portion of the stylus on the opposite side of the ball-like member 26 therefrom moves through an equal and opposite angle so as to move the X axis spool valve and Y axis spool valve by distances which are proportional to the components of motion of the tip of the stylus along the respective axes.

The stylus is universally mounted for its tilting or deflecting movement by providing a ball seat 28 in the inside wall of a stylus passage 29. The stylus passage is formed in a rotatable sleeve 30. The sleeve is counterbored at its lower end to receive a seat insert 31 which supports the ball-like member 26 against the ball seat 28. A retainer ring 32 is threaded into the counterbore to hold the seat insert in place.

Bias means 33 are attached to the lower end of the rotatable sleeve. The bias means comprise a collar 34 which is held to the rotatable sleeve 30 by a set screw 35 seated in a detent groove 36 in the outside surface of the sleeve. Said screw holds the collar rigidly to the sleeve so that the collar rotates with, but not relative to, the sleeve 30.

A depending finger 37 on the collar has a slot 38 in its outer surface, a pin passage 39 therethrough, and a counterbore 40 in the pin passage for accommodating a coil spring 41. A bayonet pin 42 is slidably fitted in the pin passage. A contact plate 43 on the end of the bayonet pin is forced against the bottom portion 27 of the stylus by the coil spring. The coil spring is in opposition between the depending finger 37 and the said contact plate.

A grip 44 is provided at the other end of the bayonet pin so that the pin can be pulled or turned as necessary. A cross pin 45 in the bayonet pin is so disposed and arranged that in the position of the cross pin shown in Fig. 1, the contact plate 43 can be forced against the stylus by the coil spring. If the bayonet pin is pulled so that the cross pin 45 leaves the slot 38, and the bayonet pin is then turned so that the cross pin makes a right angle with the slot, the cross pin will then not enter the slot 38, and the contact plate 43 will be held out of contact with the stylus so as to inactivate the bias means.

The housing of the tracer valve has a depending neck 46 with an opening 47 at the bottom thereof. Opening 47 is partially closed by plug 48, which plug contains part of a sleeve bore 49 therein. This plug 48 is threaded into the opening and has a shoulder 50 which bears against the bottom of the depending neck. A cylinder 51 is pressed into the upper end of opening 47 as shown, and is not moveable, as it is rigidly fixed to the tracer valve housing. The upper end of cylinder 51 is provided with an annular shoulder 52. The bore through cylinder 51 is coaxial with, and of the same diameter as that of the bore in plug 48, thereby forming a continuation of sleeve bore 49.

The sleeve 30 is rotatably mounted within the sleeve bore 49 in the following manner. A snap ring 53 is seated in a groove 54 in the outer surface of the rotatable sleeve 30, at a position along the length of said sleeve between the plug 48 and the cylinder 51. A ring gear 55 surrounds the sleeve and abuts against the snap ring 53. Key 56 fits in a depression in the ring gear and in the sleeve, and thereby constrains the ring gear to rotate with the rotatable sleeve 30. A fiber washer 57 surrounds the sleeve on the opposite side of the ring gear from the snap ring 53. It will be observed that pulling the rotatable sleeve 30 upward causes the snap ring 53 to press the ring gear 55 against the washer 57 which in turn is forced against the fixed cylinder 51. The fiber washer enables the ring gear 55 to rotate relative to the cylinder 51.

The upper outer end of the rotatable sleeve 30 has threads 58 thereon to which is attached an adjustment ring 59 and a lock ring 60. Turning the adjustment ring determines the exact elevation of the rotatable sleeve 30, and the ring gear 55. When the lock ring is tightened against the adjustment ring, the adjustment is maintained. It will now be appreciated that the rotatable sleeve 30 along with the ring gear attached thereto, is capable of rotating around the longitudinal axis of the stylus.

For reasons which will be later understood, it is desirable for the stylus to rotate around its own axis along with the rotatable sleeve 30. For this purpose, a key slot 61 is formed in the ball-like member 26, said slot being axially aligned with the longitudinal axis 13 of the stylus. A round pin 62 is seated in the rotatable sleeve 30, and projects into the key slot, said pin being directed radially inward toward the center of the ball-like member 26. It will be appreciated that the stylus can still be universally deflected in any direction, but that it cannot now be rotated about its own axis independently of the rotatable sleeve 30.

Sensing means are provided for determining the spacing between the rotatable sleeve 30 (or more properly, the wall of the stylus passage 29) and the stylus. This sensing means includes a circuit adapted for receiving a supply of pressurized air from a source such as a pump 62a from which air is supplied to a pressure regulator 63. A restrictor valve 64 receives air at a predetermined, regulated pressure from the pressure regulator, and supplies it to a signal conduit 67. This signal conduit 67 is tapped by a fixed orifice 66. This fixed orifice may conveniently be made adjustable for different setups, the term "fixed orifice" referring to the maintenance of orifice 66 at a given size for a given setup, the size thereof not changing with the conditions in the machine tool during a given operation. Fixed orifice 66 provides a reference leak to atmosphere from signal conduit 67.

Signal conduit 67 further interconnects to a port 68 in the tracer valve housing 46. This port 68 leads to a circumferential groove 69 in the outer periphery of cylinder 51. A passage 70 interconnects groove 69 with a circumferential groove 71 in the inside surface of cylinder 51. Groove 71 connects to a variable orifice 72. The variable orifice 72 comprises a port 73 leading from the circumferential groove 71 to the stylus passage 29 where it discharges through an opening 74 in an inclined surface 75. This inclined surface 75 makes an angle $\theta$ with the longitudinal axis of the stylus when the stylus is in its neutral position. The size of angle $\theta$ will be further discussed below. The other portion of the variable orifice comprises an orifice block 76 having an orifice face 77 thereon, which orifice face is also disposed at angle $\theta$ relative to the longitudinal axis of the stylus. It will be observed that the inclined surface 75 and the orifice face 77 are parallel when the stylus is in its central position as shown in Fig. 1, and that the spacing between said surface and face will be determined by the tilt of the stylus and also by the elevation of said orifice block on said stylus. For purposes of definition the variable orifice 72 will hereafter comprise the port 73, opening 74, inclined surface 75, and orifice face 77.

Adjustment means are provided for adjusting the spacing between the inclined surface 75 and orifice face 77 in the embodiment of Fig. 1. For this purpose, a central bore 78 is drilled downward from the top of the stylus. A compression spring 79 is seated in the bottom of said bore. A slot 80 (see Fig. 4) is milled transversely across the stylus so as to pierce the stylus, and a land 81 is provided at each outer end of said slot. The orifice block 76 slides in said slot, one part of the block bearing against one of the lands, and a plate 82 bearing against the other of said lands 81, said plate being held in place by screws 83. It will now be seen that the orifice block is slidable up and down in said slot, the compression spring tending to move the said block up, thereby increasing the spacing between the inclined surface 75 and the orifice face 77. The top of orifice block has, at a position on the central axis of the stylus, a sink 84 which receives the lower end of a push rod 85. This push rod bears against the orifice block 76 and opposes the tendency of the compression spring 79 to move the orifice block upward.

The position of the orifice block along the stylus, and therefore the amount of spacing between the inclined surface 75 and the orifice face 77, is thereby determined by the adjustment of the push rod 85, as well as by the angle of tilt of the stylus. The adjustment of the push rod 85 is secured by means of an adjustment screw 86 (see Fig. 1) which is threaded through a rate control member 87. The adjustment screw 86 has a slot 88 on top for reception of a screw driver so that the adjustment screw can be turned in either direction. A lock nut 89 holds the adjustment screw in its adjusted position.

The adjustment means is incorporated as a part of a rate control means for adjusting the maximum rate of travel of the machine tool. It will be appreciated that the greater the deflection of the stylus, the greater will be the opening of the spool valves and therefore the faster will be the rate of application of power to the machine tool. Therefore, means which restrict the deflection of the stylus will also serve to restrict the rate of travel of the machine tool. For this purpose, a plug 90 is threaded into a socket 91 in the top of the tracer housing 46. This plug has a threaded bore 92 which receives the rate control member 87. An external shoulder 93 on the rate control member holds a coil spring 94 in opposition to the plug 90 for eliminating thread play in the rate control member. As stated above, the adjustment screw 86 passes through the center of the rate control member 87. The lower portion of the rate control member has an internal conical surface 95 with a conical angle therein which is preferably 60°. To the lower end of the plug 90 there is threaded a retainer 96 having an inwardly directed flange 97 below the plug 90.

A ring member 98 which has a flange 99 is placed with its flange between the lower surface of plug 90 and flange 97 of retainer 96. The ring member has an elevated center section with a frusto-conical surface 100 having the same conical angle as surface 95. A passage 101 through said ring member, which is coaxial with the said frusto-conical surface 100, accommodates a third ball-like member 102 which is incorporated into the stylus at its upper end. This ball-like member 102 snugly fits within the passage 101 so that sideward movement of the third ball-like member 102 in any horizontal component of motion shifts the ring member correspondingly. However, the permissible sideward movement of the ring member is limited by the lateral separation between the conical surfaces 95 and 100. This separation can be changed by turning the rate control member 87 so as to move it upwardly or downwardly in the plug 90.

The signal conduit (and thus the sensing means) 67 is connected by conduit 103 to reversible means for turning the rotatable sleeve 30. Conduit 103 branches off from conduit 67 at a location between the fixed orifice 66 and the variable orifice 72, thereby conveying the pressure in the sensing system as determined by the two orifices to control means 108 for actuating other means to be described. Reversing means 104 comprises a worm gear 105 which meshes with the ring gear 55. This worm gear is driven by a flexible shaft 106, which shaft is in turn driven in either direction by a motor 107 which may, as shown, be a hydraulic motor. The motor, flexible shaft, worm gear, and ring gear and pilot means 108 to be described in the next paragraph, comprise the reversible means for turning the sleeve 30 in either direction within the housing.

The operation of the reversible means is determined by pilot means 108, which may, as stated above, be considered a part of the said reversible means. These pilot means, in essence, comprise a selector valve 109 whose position is determined by the pressure in conduit 103. The sensing means are thereby operatively connected to the reversible means for the purpose of turning the sleeve 30. The selector valve has a bellows chamber 110 which is vented to atmosphere by a port 111. Within this bellows chamber there is disposed a flexible bellows 112, to the interior of which the conduit 103 is connected. Rising pressure in conduit 103 tends to expand the bellows and diminishing pressure in conduit 103 tends to contract the bellows. In order to keep the gas volume of the sensing means as small as possible, a plug 113 is placed inside the flexible bellows. This plug fills up some of the excess volume of the bellows which otherwise would comprise an additional volume of gas which would have to change pressure in order to actuate the system. It does not change the area of the bellows, which area is needed for providing force for the purpose of actuating the valve 109.

The bellows is connected to a spool 114 which slides within a spool sleeve 115. The spool sleeve receives pressurized hydraulic fluid from a pressure source 116 at a pressure inlet 117. Exhaust outlets 118 and 119 are disposed in the wall of the spool sleeve on opposite sides of the pressure inlet, and are manifolded so as to discharge into the reservoir 120.

One member of a pair of motor supply grooves 121, 122, is disposed between each of the exhaust outlets and the pressure inlet. Motor supply groove 121 is connected to one port of a four-way valve 123 by conduit 124. Motor supply groove 122 is connected to another port of the four-way valve by means of conduit 125. Conduits 126 and 127 are connected to ports of the valve 123, and to opposite sides of the hydraulic motor 107.

The spool of the selector valve makes a sliding sealing fit within the spool sleeve 115, and has three grooves 128, 129 and 130 therein. The central groove 129 is always in communication with pressure inlet 117, while one or the other of the grooves 128 or 130 is always connected to one or the other of exhaust outlets 118 and 119, depending on the position of the spool in the spool sleeve.

A stem 131 extends upward from the spool 114 through the case of the selector valve. A balance spring 132 is opposed between the spool and the case of the selector valve so as to oppose forces exerted by the bellows. A counterweight spring 133 between a head 134 on the stem 131 outside of the selector valve case, and the selector valve case itself, counterbalances the effect of the weight of the spool.

Means other than fluid pressures may be used as sensing and control means in this invention if desired. For example, in Fig. 5 there is shown a fragmentary view of a tractor valve which incorporates electrical means for positioning the sleeve. A tracer valve 140, which will be understood to have the spool valves and the stylus mountings of tracer valve 10, is provided with a stylus 141. This stylus may be a simple round structure without the more complex variable orifice in Fig. 1. A rotatable sleeve 142 mounts the stylus 141 in the tracer valve housing. Bias means are also provided therein in the same fashion although such are not shown in this figure. The rotatable sleeve 142 carries a pair of slip rings 143, 144 which are set in grooves 145, 146 respectively. These rings are insulated from the rotatable sleeve 142 by insulating rings 147, 148.

A two-position limit switch 149 is placed in the wall of sleeve 142 and its contactor 150 is loaded by spring 151 toward and against the stylus. This contactor is made of an insulating material. Switch plate 152 is mechanically connected to contactor 150. When the contactor moves switch plate 152 radially outward from the stylus, the switch plate will make contact with an extension of slip ring 143. When the switch plate is moved radially inward toward the stylus, the switch plate makes contact with an extension of slip ring 144. The switch plate itself is grounded through the tracer valve housing to ground 153. Therefore circuit connections can be selectively applied by the switch 143 through windings 154 or 155 of a reversible electric motor for driving a worm gear to adjust the position of the bias means.

Pneumatic sensing means which do not incorporate the adjustable features of the sensing means of Fig. 1 may also be used. These simpler means do not have the delicate response in operation which results from the use of the system shown in Fig. 1, but are sufficient for many purposes. For this type of simplified installation (shown in Fig. 2) a tracer valve similar to that shown in Fig. 1 may be utilized except that an outer surface of the stylus 157 itself is opposed to port 158. The stylus and port 158 thereby constitute a variable orifice which can be connected to signal conduit 67.

It may not be desired to have the mechanical bias means 33 shown at the lower end of the tracer valve in Fig. 1. Instead, a fluid-operated means may be preferred, such as the plunger 160 in cylindrical 161 in the wall of rotatable sleeve 30. The cylinder is connected by conduit 162 to a valve 163 and pressure source 164.

The operation of the machine tool control shown in Fig. 1 will now be described. It will be assumed that the cutter and the workpiece to be shaped are properly set up in the same relationship to each other as the protruding bottom (tip) portion of the stylus bears to the template or pattern T, to be traced. Customarily, the tracer valve and the cutting tool are mounted so as to move with each other, and the template and workpiece are mounted to a common base so that they move together. Therefore once the machine tool is properly set up, a movement between the template and the tracer valve is duplicated between the cutter and the workpiece. It is the function of the stylus tip to be moveable toward and along the template to control the spool valves in the tracer valve and cause movements which shift the tracer valve and cutting tool relative to the template and the workpiece, respectively. The template acts as a limiting means which causes the spool valves to go into a neutral position when the tracer valve (and therefore the cutting tool) is located at the correct position. Thereafter, the stylus tip must be manually displaced to cause the desired relative movements. The aforesaid patent No. 2,753,145 may be referred to for a more detailed description of the operation of this type of tracer valve, particularly with respect to the flow of hydraulic fluid through the spool valves when the stylus tip is deflected.

The common means of operating a machine tool control of this type is to displace the stylus tip toward the template. When the tip initially strikes the template, the stylus is still slightly deflected. Further movement of the valve toward the template in response to this deflection lessens the deflection, until the template restores the stylus to a neutral position. This is as far as the tracer valve will approach the template at the point of contact, because any such further movement would displace the stylus tip away from the template, and would therefore back the tracer valve and the cutting tool away from the template and workpiece, respectively. Therefore a null position results at the correct adjustment of cutting tool and workpiece. It will be appreciated from the above statements that the depth of a cut normal to the surface of the template at any given point is determined by restoring the stylus to a position in a plane which is perpendicular to said normal line at that point of contact.

It will also be understood that even when the stylus lies in such a plane, it can still be deflected so as to cause lateral movement along the template. This deflection causes the tracer valve to trace along the edge of the template or pattern.

The operation of this valve is therefore resolved into the actions of holding the stylus tip against the surface of the template or pattern, and simultaneously displacing the tip transversely along the edge thereof to trace the template outline. The actual way this is done is to exert a force on the stylus tip which is oblique to the normal to the template. This creates a force component normal to the template for holding the stylus tip against the template edge, and also a force component tending to displace the stylus laterally along the surface of the template. The stylus will thereupon trace along the template and stay in contact therewith.

This machine tool control will automatically trace along a template or pattern, then, so long as the stylus tip is biased so that a component of force tends to deflect the stylus tip along the line normal to the profile of the template at the point of contact therewith, and another component tends to deflect the stylus tip along a line lateral to said normal line. It will now be appreciated that the machine tool control will automatically cause a tracing action so long as the bias means, that is, the bayonet pin 42 or the plunger 160, exerts its force at an appropriate angle. An angle of 45° to the said normal line has been found most advantageous, although other angles, both larger and smaller, can also be used.

The set up of the tool of Fig. 1 is accomplished as follows: The rate control member 87 is screwed down until it bears against the ring member 98. This centers the stylus. Then, with lock nut 89 loosened, adjustment screw 86 is threaded down against rod 85 until, with the air turned on in the signal line 67, there is no operation of the motor 107 in either direction. This adjusts the variable orifice 72 to its null position. Then, while holding the adjustment screw 86 against any rotation, the rate control member 87 is threaded back so as to allow a clearance between said rate control member and the ring member 98. This clearance is adjusted so that it permits the maximum desired deflection of the stylus tip, and no more. This adjustment may be checked by a deflection indicator applied at the stylus tip. At this position, the lock nut 89 is tightened, and both the variable orifice and the rate control are adjusted in their working position.

To cause the tracing valve to trace along the profile of template T, the bayonet pin 42 is allowed to bear against the stylus 14 so as to move the stylus toward the template. If the bias is not initially in the correct direction, the stylus is deflected manually, thereby temporarily overpowering the bias means. The bias means will be permitted to take over control of the machine tool once the stylus is brought to the correct initial location along the template profile. It will be observed from Fig. 3 that the variable orifice and the bias means make an angle with respect to each other, which is preferably but not necessarily, 45°. When the stylus makes contact with the template T, the template attempts to restore the stylus to a neutral position. However, the bias means, being disposed at 45° with the normal to the point of contact with the template, tends to deflect the stylus longitudinally along the template while still holding the stylus in contact therewith.

Assuming for a moment that the template recedes away from the stylus, then the bayonet pin (or the plunger 160 if this bias means is used instead) will deflect the stylus so as to move the orifice surface 77 toward the inclined surface 75, increasing the resistance to leakage of air thereby and raising the pressure in signal conduit 67. This raises the pressure in bellows 112 and shifts the spool 114 upward. This connects pressure groove 117 with motor supply conduit 124, which proceeds to hydraulic motor 107 which motor turns the worm gear 105 so as to rotate the sleeve, and with it the bias means. This rotation is clockwise with respect to both Figs. 3 and 6. Fig. 6 illustrates the need for rotation in this direction. Point 200 is the point of contact between stylus 14 and the profile of the template at a position where the template profile is curving (sometimes called "sloping") away from the traverse direction. Line 201 is a normal to the template at point 200, and line 202 is a line perpendicular to the normal; that is, tangent to the template profile at point 200. In order for the stylus to remain in contact with the profile and still trace along it, the bias force (shown applied at the point of contact for convenience in disclosure), is exerted along line 203. This gives a normal component 204 and a lateral component 205. The normal component maintains contact with the profile, and the lateral component displaces the stylus so that the stylus traces along the profile. It will be appreciated that once the bias means are adjusted to apply said two components at any slope, or direction, relative to the traverse direction, and that slope remains constant, there will be no further change in bias position until the slope changes again.

A slope change wherein the template edge approaches the stylus is shown at the left hand side of Fig. 6. Then the template will push the stylus against the resistance of the bias means so as to increase the separation of the inclined surface 75 and the orifice surface 77. The pressure in signal conduit 67 decreases. Bellows 112 starts to collapse, and spool 114 moves downward in Fig. 1. Pressure groove 129 then is in communication with motor supply groove 122, and pressurized hydraulic fluid is supplied to motor 107 through conduits 125 and 126. This causes a counter-clockwise rotation of the bias means in Fig. 2, which is opposite in sense from the rotation described above in the situation where the template receded from the stylus. This counterclockwise rotation of the bias means moves the point of application of bias force to a radial position where the desired normal and lateral components of force are exerted.

There is a unique direction of application of bias force for any angle of the profile relative to a selected axis, such as the X axis, which axis may be called the "traverse direction" as shown in Fig. 6. Once the mechanism herein has adjusted the direction of the bias to correspond with some given angle which the tangent to the template makes at the point of contact, the bias direction remains unchanged until this angle again changes. Thus, there is no further change whenever the profile is a straight line, regardless of its angle with the X axis. A change in bias direction does need to be made when the angle of the tangent changes, and here there are two cases: (1) where the template profile curves away from the traverse direction, and (2) where the template profile curves toward said traverse direction. In case (1), as illustrated at the right hand portion of Fig. 6, the curvature of the template tends to reduce, or even eliminate, the normal force component. Therefore a clockwise rotation of the bias means is called for in order to keep the stylus in contact with the template. In case (2), as shown at the left hand end of Fig. 6, the curvature of the template tends to reduce, or even eliminate, the lateral force component. Therefore a counterclockwise rotation of the bias means is called for in order to keep the stylus moving along the template profile.

Cases (1) and (2) are discreet conditions, and there is no redundancy or confusion between them. In case (1), signal pressure rises above the null value. In case (2), it falls below the null value. The sense of the bias rotation is thereby uniquely determined. Null conditions are restored when the bias means supply its force at a 45° angle to the normal at the point of contact. Similar considerations apply with respect to the electrical system of Fig. 5.

It will be seen that the above is all that is necessary in order to keep the stylus tracing along the surface of the template. The essence of this technique is to keep the bias means at an angle to the normal at the point of contact with the template.

Should it be desired to trace in the opposite direction, then the valve 123 will be turned so that the motor supply conduits 124 and 125 supply opposite sides of the motor 107. The bias means will be swung clockwise 90° in Fig. 3, so as to bias the stylus in the next quadrant. The device will thereupon trace in the opposite direction.

Although an angle of 45° has been thus suggested between the exertion of bias means and the location of the secondary orifice it will be understood that more or less degrees may be provided for and that the angle may be in either direction so as to permit of reversal of the machinery.

The means for adjusting the variable orifice in Fig. 1 are provided in order to compensate said secondary orifice for the errors of non parallelism which results from the tilting of the stylus. It will be observed that when the stylus tilts in either direction, the rod 85 permits the block 76 to rise slightly so as to increase the spacing in the secondary orifice over what this spacing would have been had this rod not been provided. It has been found that the signal in line 67 which results from using this device is more nearly proportional to stylus deflection than when such a device is not used.

The angle between surface 77 and axis 13 is preferably, though not necessarily, about 15°. This is a suitable angle when surface 95 has a conical angle of about 60°.

The more complex secondary orifice of Fig. 1 is not necessary for some simple manufacturing techniques, and in that case the spacing between the surface of stylus 157 and port 158 shown in Fig. 2 will give a suitably accurate signal for manufacturing purposes. The signal provided to signal conduit 67 from the device of Fig. 2 is used in precisely the same manner as that shown in Fig. 1.

In Fig. 5 a two-position limit switch is shown as a source of a reversing signal, whereby, when the stylus is moved so that the portion shown above the mounting ball is deflected to the right in Fig. 5, a connection is made to winding 155, while in the other position a connection is made to winding 154 of the reversible motor. This reversible motor is connected to a flexible shaft such as shaft 106 which shifts a bias means in the manner illustrated in Fig. 1.

It will thereby be appreciated that all embodiments of this invention provide a means for maintaining a properly oriented bias force upon a stylus tip for maintaining said tip in contact with a template or pattern and displacing it laterally so that the tracer valve moves along the template in tracing relationship.

This releases machinists for other jobs and also serves to relieve them from the tedious task of manually tracing the stylus tip across the pattern or template. However, the bias forces are not large and can be manually overridden as desired. Particularly in the device shown in Fig. 1, valve 163 can be turned off, and bayonet pin 42 can be retracted and turned so as to inactivate the bayonet control and return this device to a complete manual operation, thereby over-riding the automatic control at will. It will be understood that normally only one of the bias means shown in Fig. 1 will be used at any given time.

This invention is not to be limited by the embodiments shown in the drawings and described in the description, which are given by way of example and not of limitation, but only in accordance with the scope of the appended claims.

I claim:

1. In combination with a tracer valve having a deflectible stylus with a tip for tracing along the profile of a pattern, said stylus having an axis and being deflectible to seek contact with said profile, and being deflectible by the said profile, bias means mounted for movement about the stylus axis for exerting a force on said stylus to deflect the stylus, sensing means for detecting the said stylus deflection, and reversible means controlled by the sensing means for moving the point of application of said bias force to various positions around the stylus axis so as to exert components of force normal to and tangent to the profile of the template at the point of contact between the profile and the stylus.

2. Apparatus according to claim 1 in which the sensing means comprises a source of fluid pressure, a signal conduit receiving fluid under pressure from said source, and a variable orifice in fluid communication with said signal conduit, the condition of the variable orifice being determined by the deflection of the said stylus whereby the pressure in said signal conduit is varied in accordance with the deflection of said stylus, and the said pressure in the signal conduit is used as a signal for controlling the said reversible means.

3. Apparatus according to claim 2 in which said reversible means are connected to said signal conduit for receiving the pressure in said signal conduit as a signal, said reversible means including driving means for moving the bias means about said axis, and pilot means responsive to the signal received from the signal conduit for determining the direction of operation of said driving means.

4. Apparatus according to claim 3 in which said driving means includes a pair of gears, a first of said gears being attached to said bias means, and the other of said gears being fixed relative to the said tracer valve and meshing with said first gear, the latter gear being turned when said driving means are actuated so as to rotate the bias means.

5. Apparatus according to claim 3 in which a fixed orifice bleeds from said signal conduit.

6. Apparatus according to claim 1 in which the sensing means comprises switch means actuable by contact with the said stylus.

7. Apparatus according to claim 6 in which said switch means comprises a three-position switch having a null position and also two actuating positions, said switch, when in one of its actuating positions actuating said reversible means in one or the other of two rotational directions, said reversible means including reversible motor means whose direction of rotation is determined by circuits completed through one or the other of said actuating positions of said switch means.

8. In combination with a tracer valve having a deflectible stylus having an axis and a tip for tracing along the profile of a pattern, said stylus being mounted in a rotatable sleeve in said tracer valve, so as to be rotated around its axis with said sleeve and to be deflectible within said sleeve, the improvement comprising bias means for exerting a force on said stylus which bias means are attached to and movable with the said sleeve, sensing means for detecting and indicating the deflection of the said stylus, reversible means for rotating said sleeve, said reversible means being responsive to said sensing means, whereby the reversible means in response to a signal from said sensing means rotates the sleeve in one rotational direction or the reverse for changing the direction relative to the axis of the stylus that the force of said bias means is applied to said stylus, so as to exert components of force both normal to and tangent to the profile of the pattern at the point of contact between said pattern and said stylus.

9. Apparatus according to claim 8 in which said sensing means comprises a source of fluid pressure, a signal conduit receiving fluid under pressure from said source, a variable orifice in fluid communication with said signal conduit, the condition of the variable orifice being determined by the deflection of the said stylus whereby the pressure in said signal conduit is varied in accordance with the deflection of said stylus, and the said pressure in the signal conduit is used as a signal for controlling the said reversible means.

10. Apparatus according to claim 9 in which said reversible means are connected to said signal conduit for receiving the pressure in said signal conduit as a signal, said reversible means including driving means for rotating the bias means, and pilot means responsive to the signal received from the signal conduit for determining the direction of operation of said driving means.

11. Apparatus according to claim 9 in which a fixed orifice bleeds from said signal conduit.

12. Apparatus according to claim 8 in which the variable orifice comprises an inclined surface having an orifice port discharging therethrough from said signal conduit, and an orifice face on the said stylus which face is substantially parallel to the said inclined surface and spaced therefrom for controlling the discharge from said orifice port, and the spacing of said surface from said orifice face being varied by the deflection of the stylus.

13. Apparatus according to claim 12 in which the orifice face is formed on a member mounted slidably on the stylus, and in which adjustment means are provided for adjusting the position of said member along said stylus.

14. Apparatus according to claim 13 in which said adjustment means comprise spring means which tends to force said slidable member in one direction along the stylus, and a rod extending into said stylus and interposed between an abutment and the said slidable member in opposition to said spring through the member, said rod being so disposed and arranged as to tilt when the stylus is deflected thereby permitting an axial movement of the slidable member.

15. Apparatus according to claim 12 in which a fixed orifice bleeds from said signal conduit.

References Cited in the file of this patent

UNITED STATES PATENTS

| | | |
|---|---|---|
| 1,959,178 | Sassen | May 15, 1934 |
| 1,996,438 | Shaw | Apr. 2, 1935 |
| 2,332,532 | Roehm | Oct. 26, 1943 |